US012545038B2

(12) United States Patent
Sasaki et al.

(10) Patent No.: US 12,545,038 B2
(45) Date of Patent: Feb. 10, 2026

(54) PRINTING APPARATUS, CONTROL METHOD FOR PRINTING APPARATUS, AND CONVEYANCE APPARATUS

(71) Applicant: CANON KABUSHIKI KAISHA, Tokyo (JP)

(72) Inventors: Takashi Sasaki, Kanagawa (JP); Shuichi Tokuda, Kanagawa (JP); Yuki Emoto, Tokyo (JP); Koki Kudo, Kanagawa (JP); Hideyasu Ishihara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 200 days.

(21) Appl. No.: 18/376,903

(22) Filed: Oct. 5, 2023

(65) Prior Publication Data

US 2024/0116301 A1 Apr. 11, 2024

(30) Foreign Application Priority Data

Oct. 6, 2022 (JP) ................................ 2022-161833

(51) Int. Cl.

*B41J 13/00* (2006.01)
*B41J 11/00* (2006.01)
*B41J 13/03* (2006.01)
*B65H 7/02* (2006.01)

(52) U.S. Cl.

CPC ....... *B41J 13/0009* (2013.01); *B41J 11/0095* (2013.01); *B41J 13/03* (2013.01); *B65H 7/02* (2013.01); *B65H 2513/10* (2013.01); *B65H 2701/1311* (2013.01); *B65H 2701/1313* (2013.01)

(58) Field of Classification Search

CPC .... B41J 13/0009; B41J 11/0095; B41J 13/03; B41J 11/42; B41J 11/36; B65H 7/02; B65H 2513/10; B65H 2701/1311; B65H 2701/1313

USPC ........................................................... 347/16

See application file for complete search history.

(56) References Cited

U.S. PATENT DOCUMENTS

| | | | | |
|---|---|---|---|---|
| 10,870,550 | B2 | 12/2020 | Tokuda et al. | |
| 11,142,001 | B2 | 10/2021 | Sakurai et al. | |
| 11,167,945 | B2 | 11/2021 | Matsuura et al. | |
| 2002/0051026 | A1* | 5/2002 | Shoji | B41J 11/42 347/16 |
| 2019/0299675 | A1* | 10/2019 | Hattori | B65H 9/006 |

FOREIGN PATENT DOCUMENTS

| | | | |
|---|---|---|---|
| JP | 4921055 | B2 | 4/2012 |

* cited by examiner

*Primary Examiner* — Jason S Uhlenhake
*Assistant Examiner* — Alexander D Shenderov
(74) *Attorney, Agent, or Firm* — Venable LLP

(57) ABSTRACT

A printing apparatus includes a first conveyance unit provided in a conveyance path and configured to convey a print medium, a second conveyance unit provided upstream of the first conveyance unit in the conveyance path and configured to convey a print medium, a drive source configured to drive the first conveyance unit and the second conveyance unit, and a control unit configured to control the drive source so as to execute a conveying operation in which a second print medium succeeding a first print medium is conveyed by the second conveyance unit while the first print medium is conveyed by the first conveyance unit. The control unit is configured to switch drive control of the drive source in accordance with a position of the second print medium when starting the conveying operation.

12 Claims, 11 Drawing Sheets

FIG. 11

| TABLE | LEADING END POSITION OF PRINT MEDIUM S2 | ACCELERATION($m/s^2$) | ROTATIONAL SPEED (rpm) |
|---|---|---|---|
| 1 | OUTSIDE PREDETERMINED REGION A1 | a1 | n |
| 2 | INSIDE PREDETERMINED REGION A1 | a2(<a1) | n |

PRINTING APPARATUS, CONTROL METHOD FOR PRINTING APPARATUS, AND CONVEYANCE APPARATUS

BACKGROUND OF THE INVENTION

Field of the Invention

The present invention relates to a printing apparatus, a control method for the printing apparatus, and a conveyance apparatus.

Description of the Related Art

There is known an apparatus that conveys a sheet by using a motor as a drive source. For example, Japanese Patent No. 4921055 discloses a printing apparatus that conveys a sheet by performing servo control of a DC motor using an encoder and driving first and second rollers arranged in the conveying direction using the DC motor.

From the viewpoint of reducing the number of components, downsizing the apparatus, and the like, a plurality of conveyance rollers may be driven by the same motor as in the related art described above. In addition, from the viewpoint of improving the sheet conveyance efficiency and the like, both the conveyance of a preceding print medium and the conveyance of a succeeding print medium may be concurrently performed by using conveyance units such as a plurality of conveyance rollers arranged in the conveying direction. In this case, the torque required to convey the succeeding print medium can vary depending on, for example, the position of the succeeding print medium on the conveyance path. In a case in which a plurality of rollers arranged in the conveying direction are driven by the same motor as in the related art described above, the motor may suffer a shortage of torque depending on, for example, the position of the succeeding print medium. This may cause a deterioration in conveyance accuracy or the stoppage of the driving of the motor.

SUMMARY OF THE INVENTION

The present invention provides a technique of more effectively performing the drive control of a drive source that drives a plurality of conveyance units.

According to an aspect of the present invention, there is provided a printing apparatus comprising: a first conveyance unit provided in a conveyance path and configured to convey a print medium; a second conveyance unit provided upstream of the first conveyance unit in the conveyance path and configured to convey a print medium, a drive source configured to drive the first conveyance unit and the second conveyance unit; and a control unit configured to control the drive source so as to execute a conveying operation in which a second print medium succeeding a first print medium is conveyed by the second conveyance unit while the first print medium is conveyed by the first conveyance unit, wherein the control unit is configured to switch drive control of the drive source in accordance with a position of the second print medium when starting the conveying operation.

Further features of the present invention will become apparent from the following description of exemplary embodiments (with reference to the attached drawings).

BRIEF DESCRIPTION OF THE DRAWINGS

FIG. 11 is a view showing an example of a feed drive table for a drive motor.

DESCRIPTION OF THE EMBODIMENTS

Figure 1:
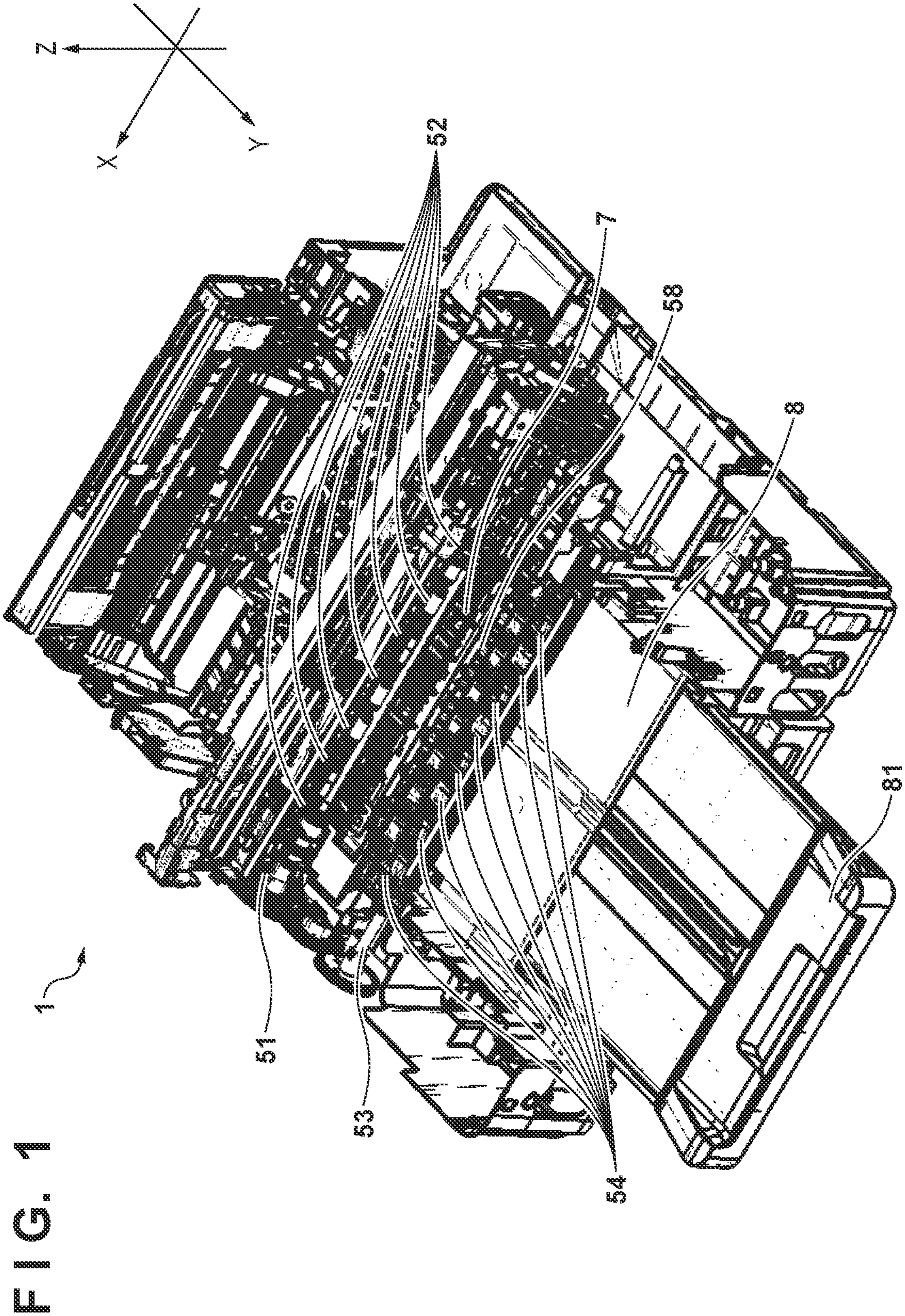
FIG. 1 is a perspective view showing the internal structure of a printing apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are used for the same or similar configurations, and redundant description thereof is omitted.

<Outline of Printing Apparatus>

Figure 2:
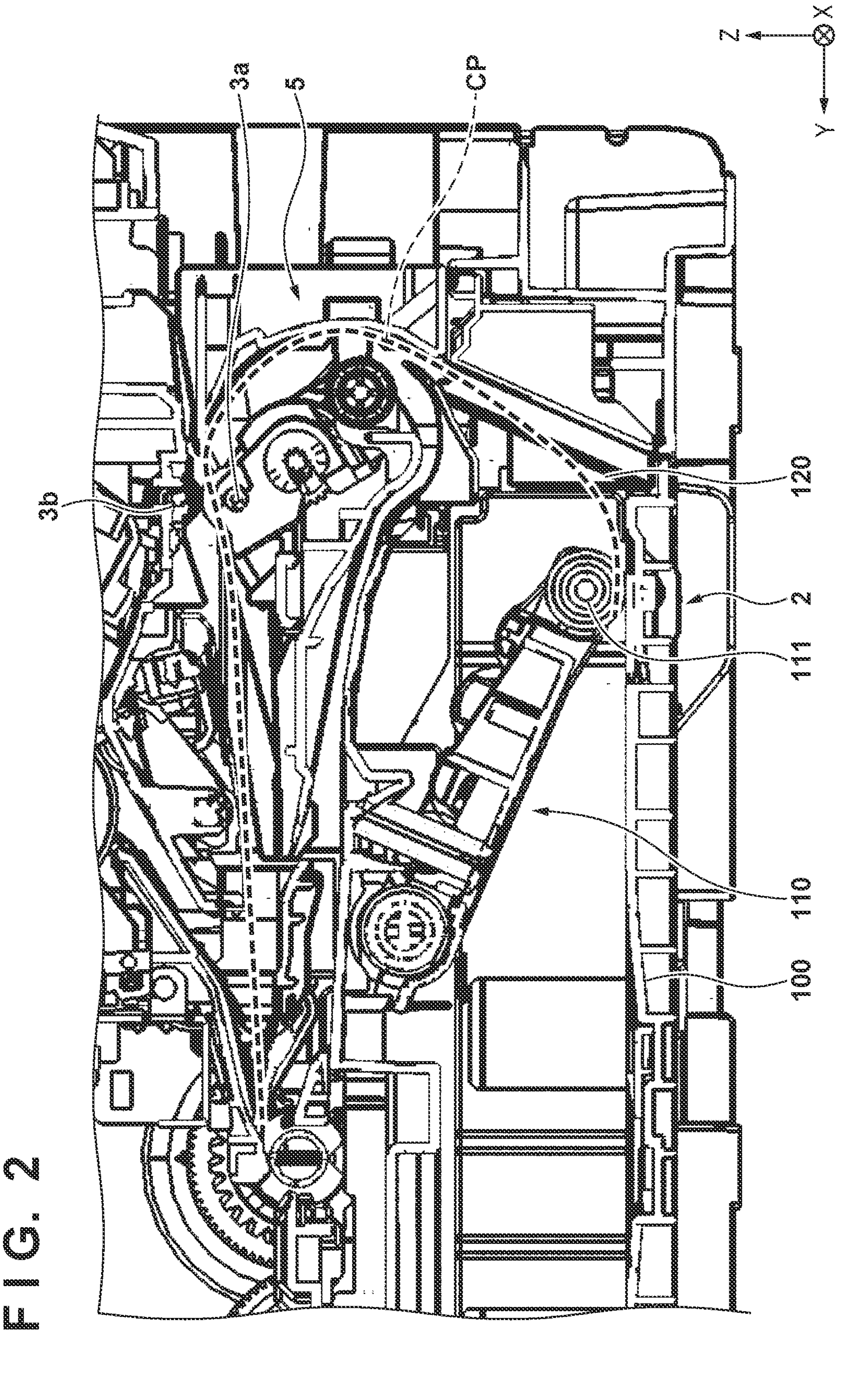
FIG. 2 is a sectional view of the feeding unit and the conveyance unit of the printing apparatus in FIG. 1.

FIG. 1 is a perspective view showing the internal structure of a printing apparatus 1 according to an embodiment. FIG. 2 is a sectional view of a feeding unit 2 and a conveyance unit 5 of the printing apparatus 1 in FIG. 1.

The printing apparatus 1 performs printing on a print medium. In this embodiment, the printing apparatus 1 is a serial inkjet printing apparatus that performs printing by discharging ink onto a print medium. The printing apparatus 1 includes the feeding unit 2, the conveyance unit 5, a drive motor 6 (see FIG. 6), a printing unit 7, and a discharge unit 8.

The feeding unit 2 and the conveyance unit 5 convey a print medium (sheet). The feeding unit 2 includes a pickup roller 111. The conveyance unit 5 includes a conveyance roller 51, a discharge roller 53, and an intermediate roller pair 3. The feeding unit 2 and the conveyance unit 5 will be described in detail later.

The printing unit 7 performs printing on a conveyed print medium. For example, the printing unit 7 includes a print head 71 (see FIG. 8) that can discharge ink and a carriage 72 (see FIG. 8) on which the print head 71 is mounted and which can reciprocate in the scanning direction (the widthwise direction of a print medium which intersects the conveying direction). For example, causing the carriage 72 to move the print head 71 in the scanning direction can perform printing at an arbitrary position on a print medium in the widthwise direction.

The print medium on which printing is performed by the printing unit 7 is discharged from the discharge unit 8. The discharge unit 8 includes a discharge tray 81. The print medium on which printing is performed by the printing unit 7 is discharged onto the discharge tray 81 by the discharge roller 53 of the conveyance unit 5 (to be described later).

The drive motor 6 transmits its drive power to the conveyance roller 51, the discharge roller 53, an intermediate roller 3*a*, and the roller of the feeding unit 2 through a gear train 37. That is, the drive motor 6 drives each of a plurality of rollers that convey a print medium. For example, the conveyance roller 51 and the pickup roller 111 are driven by the same drive motor 6.

In this embodiment, a conveyance path CP for print media is formed in the printing apparatus 1. The conveyance path CP is a path extending from the feeding unit 2 to the discharge unit 8 through the conveyance unit 5. Note that in the following description, the feeding unit 2 side and the discharge unit 8 side of the conveyance path CP will be respectively referred to as a conveying-direction upstream side and a conveying-direction downstream side. In addition, the driving direction of the drive motor 6 when rotating to make the conveyance roller 51 convey a print medium to the conveying-direction downstream side will be sometimes referred to as a forward direction, and the driving direction of the drive motor 6 when rotating to make the conveyance roller 51 convey a print medium to the conveying-direction upstream side will be sometimes referred to as a reverse direction.

<Feeding Unit>

Figure 3:
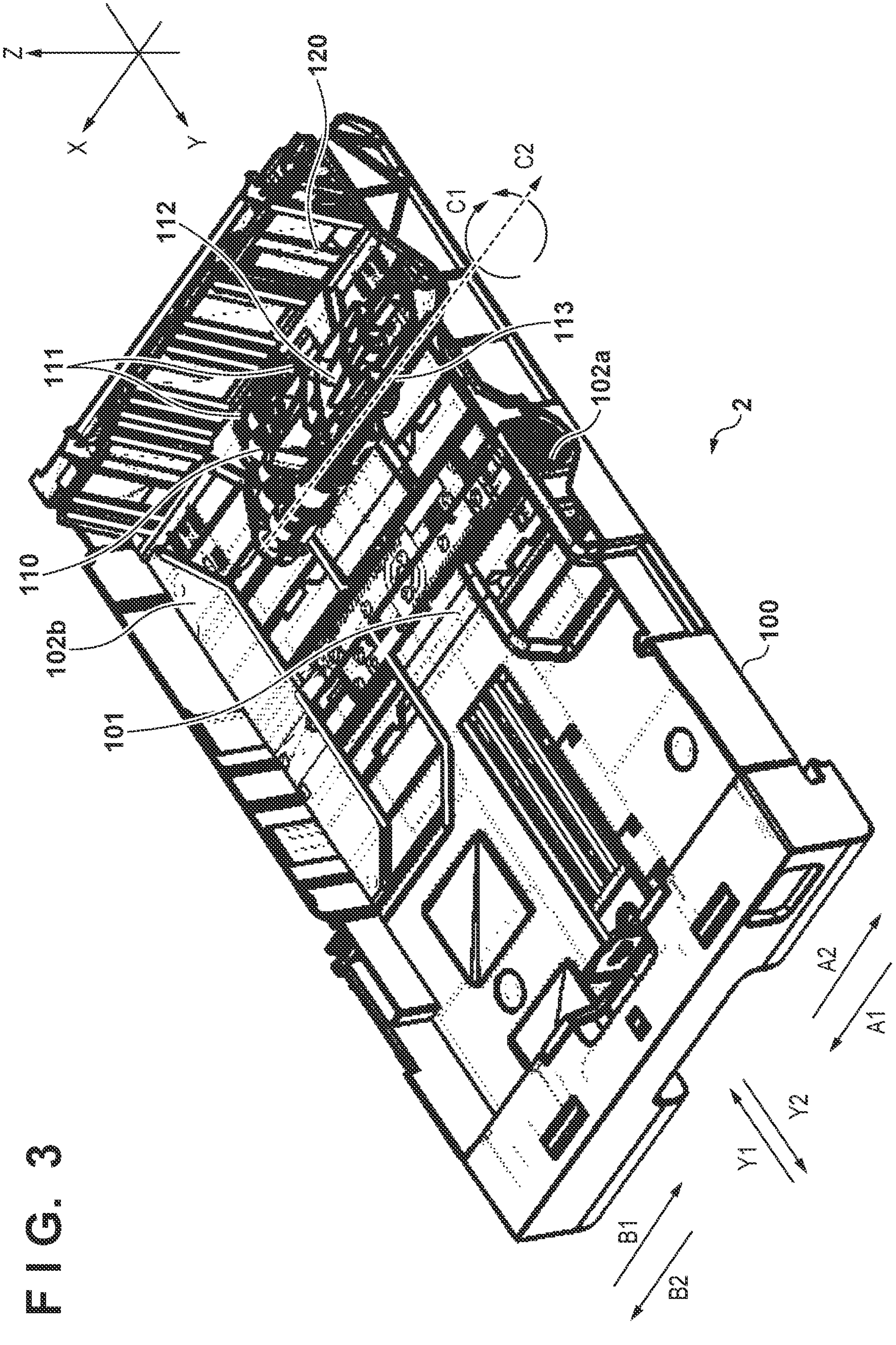
FIG. 3 is a perspective view of the feeding unit.

FIG. 3 will also be referred to below. FIG. 3 is a perspective view of the feeding unit 2. The feeding unit 2 feeds (conveys) a print medium to the conveyance unit 5. The feeding unit 2 includes a cassette 100, a pickup roller unit 110, and a separation unit 120.

The cassette 100 can store a plurality of stacked print media. In this embodiment, the cassette 100 is provided in a lower portion of the housing of the printing apparatus 1. Furthermore, the cassette 100 is provided below the printing unit 7. The cassette 100 includes a stacking portion 101 in which print media are stacked and left and right side guides 102*a* and 102*b* that guide side portions of a print medium in the widthwise direction. The side guides 102*a* and 102*b* align the left and right side faces of print media. The positions of the side guides 102*a* and 102*b* can be adjusted in accordance with the width of a print medium. The side guides 102*a* and 102*b* are configured to move in tandem with each other in the arrow A1 and B1 directions approaching each other and move in tandem with each other in the arrow A2 and B2 directions separating from each other while facing both side portions of the print medium. This arrangement aligns the print medium so as to make its center in the widthwise direction (the X direction in FIG. 3) be always located at a constant position. In addition, the stacking portion 101 can move in the arrow Y1 and Y2 directions and is moved by operation by the user. For example, print media are stacked (set) on the stacking portion 101 while it is pulled out most in the Y2 direction.

The pickup roller unit 110 is a unit for feeding (conveying) a print medium. A print medium stacked on the cassette 100 is fed to the conveyance unit 5 by the pickup roller 111 included in the pickup roller unit 110. The pickup roller unit 110 is placed above the stacking portion 101. The pickup roller unit 110 includes the pickup roller 111, a pickup arm 112, and a drive shaft 113.

The pickup roller 111 is provided upstream of the conveyance roller 51 in the conveying direction in the conveyance path CP and conveys a print medium along the conveyance path CP. In addition, the pickup roller 111 conveys a print medium stacked on the stacking portion 101 to the conveyance path CP.

The pickup arm 112 can rotate about the drive shaft 113 in the arrow C1 and C2 directions in accordance with the stacking height of print media stacked on the stacking portion 101. The distal end of the pickup arm 112 is provided with the pickup roller 111 that feeds the uppermost print medium. A drive force is transmitted from the drive motor 6 (not shown) to the pickup roller 111 through the drive shaft 113 and an idler gear (not shown). In addition, the pickup roller unit 110 is provided with a biasing member (not shown) that biases the pickup arm 112 in the arrow C1 direction. This biasing member presses the pickup roller 111 against a print medium with a predetermined biasing force in the standby state of the pickup roller unit 110. The pickup roller 111 is positioned to come into contact with the print medium in the center of the print medium in the widthwise direction.

Figure 4B:
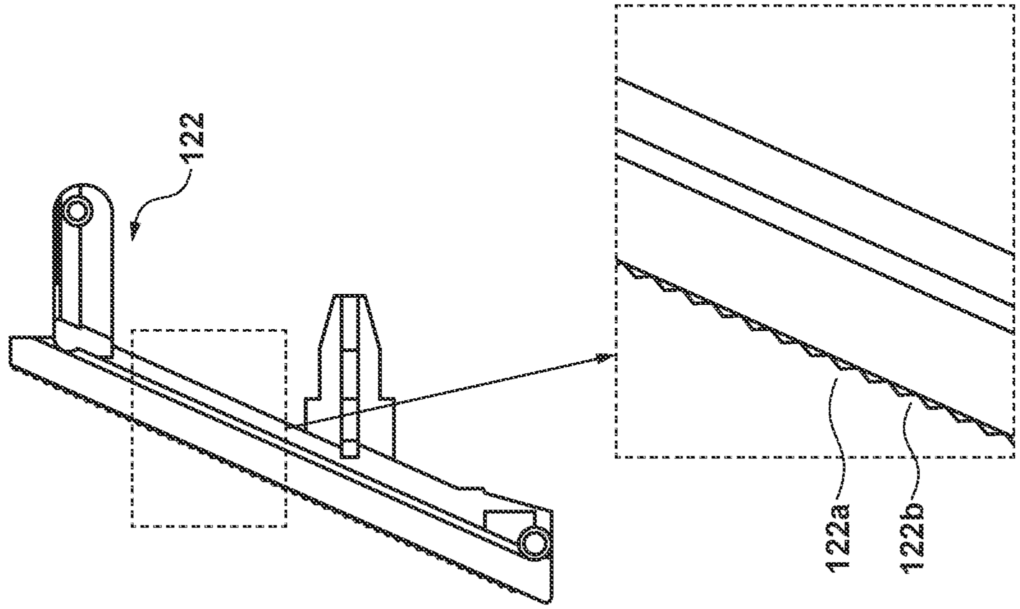
FIGS. 4A and 4B are views for explaining the structure of a separation unit.
Figure 4A:
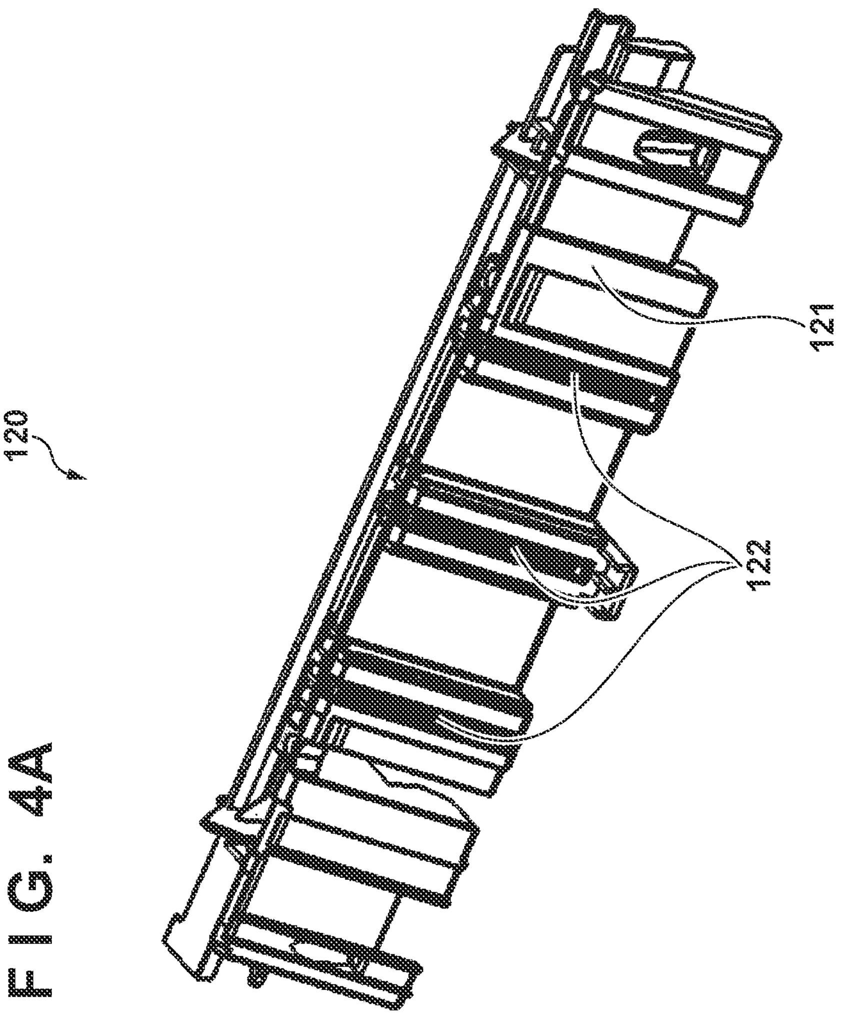
Figure 5C:
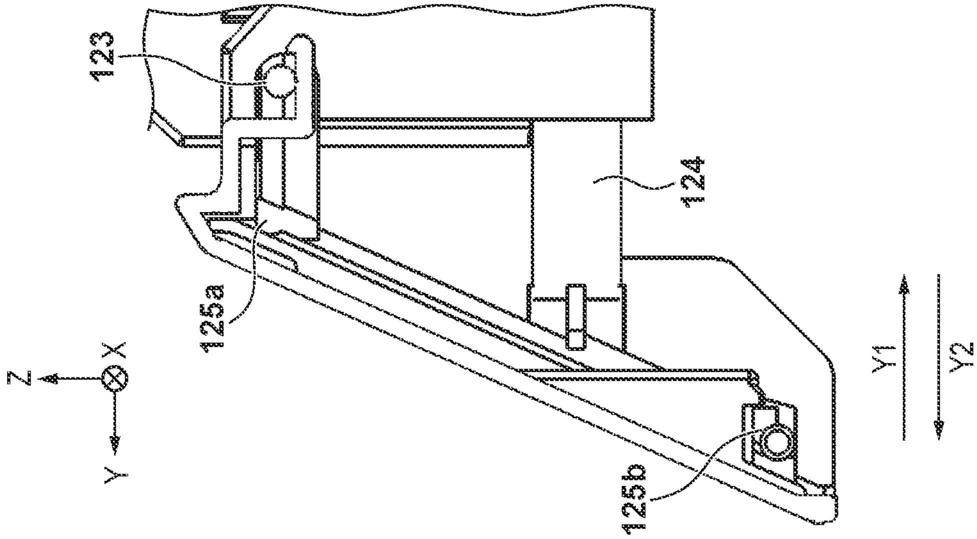
FIGS. 5A to 5C are views for explaining the structure of the separation unit.
Figure 5B:
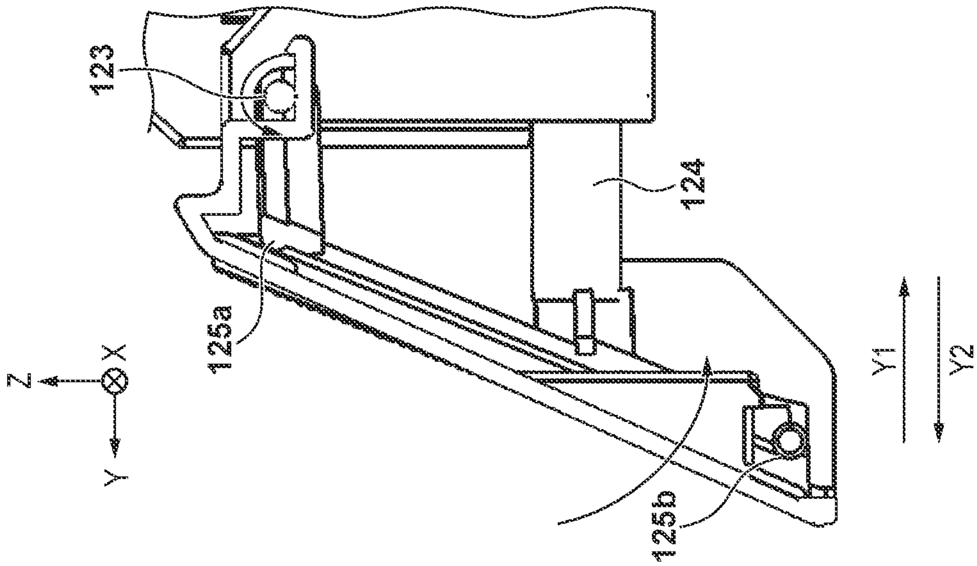
Figure 5A:
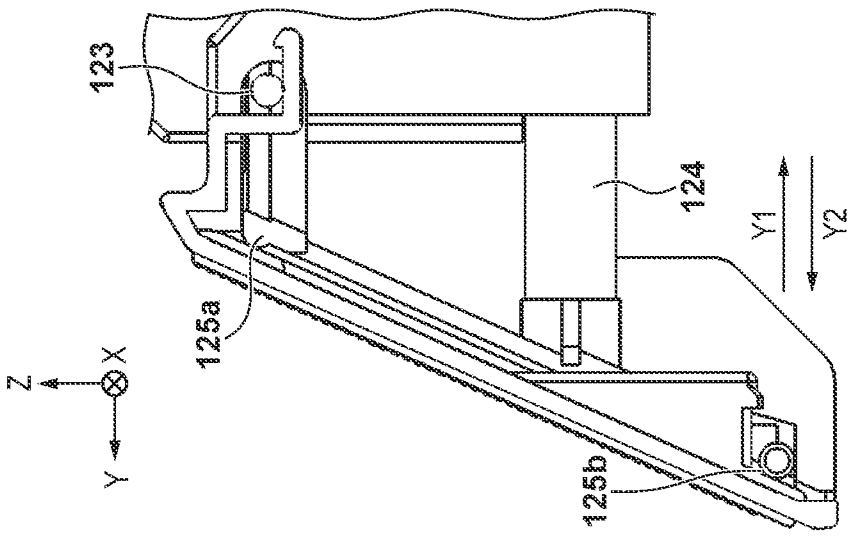

The separation unit 120 separates the uppermost print medium of the print media stacked on the stacking portion 101 from the remaining print media. FIGS. 4A to 5C are views for explaining the structure of the separation unit 120. The separation unit 120 is placed on the downstream side (the arrow Y1 side) in the feeding direction of print media in the stacking portion 101. The separation unit 120 is provided with an inclined surface member 121 and a separation piece 122. An inclined surface with an obtuse angle formed with respect to the feeding direction (arrow Y1 direction) of print media is formed on the inclined surface member 121 to give a predetermined separation resistance force to a print medium. A plurality of arc protrusions 122*a* are consecutively formed on the upper surface of the separation piece 122 at a predetermined pitch in the vertical direction (FIG. 4B). Valley portions 122*b* are formed between the arc protrusions 122*a*. The separation piece 122 can move in the arrow Y1 and Y2 directions along a guide portion 123 provided on the inclined surface member 121 (FIGS. 5A and 5B). As shown in FIG. 5A, in the standby state, the separation piece 122 abuts against Y-direction abutment surfaces 125*a* and 125*b* of the inclined surface member 121 with the biasing force of a biasing member 124 in the arrow Y2 direction and protrudes from the inclined surface member 121 in the arrow Y2 direction. In addition, when a print medium is fed, the separation piece 122 is pushed by the print medium on the stacking portion 101 to move in the arrow Y1 direction. In this case, depending on the frictional resistance between the guide portion 123 and the separation piece 122 and the position where the separation piece 122 is pressed by the biasing member 124 and the print medium, the separation piece 122 makes rotational motion about the guide portion 123 as shown in FIG. 5B if the position where the separation piece 122 is pressed by the print medium is low, whereas if the position where the separation piece 122 is pressed by the print medium is high, the separation piece 122 translates in the Y1 direction as shown in FIG. 5C.

<Conveyance Unit>

Figure 6:
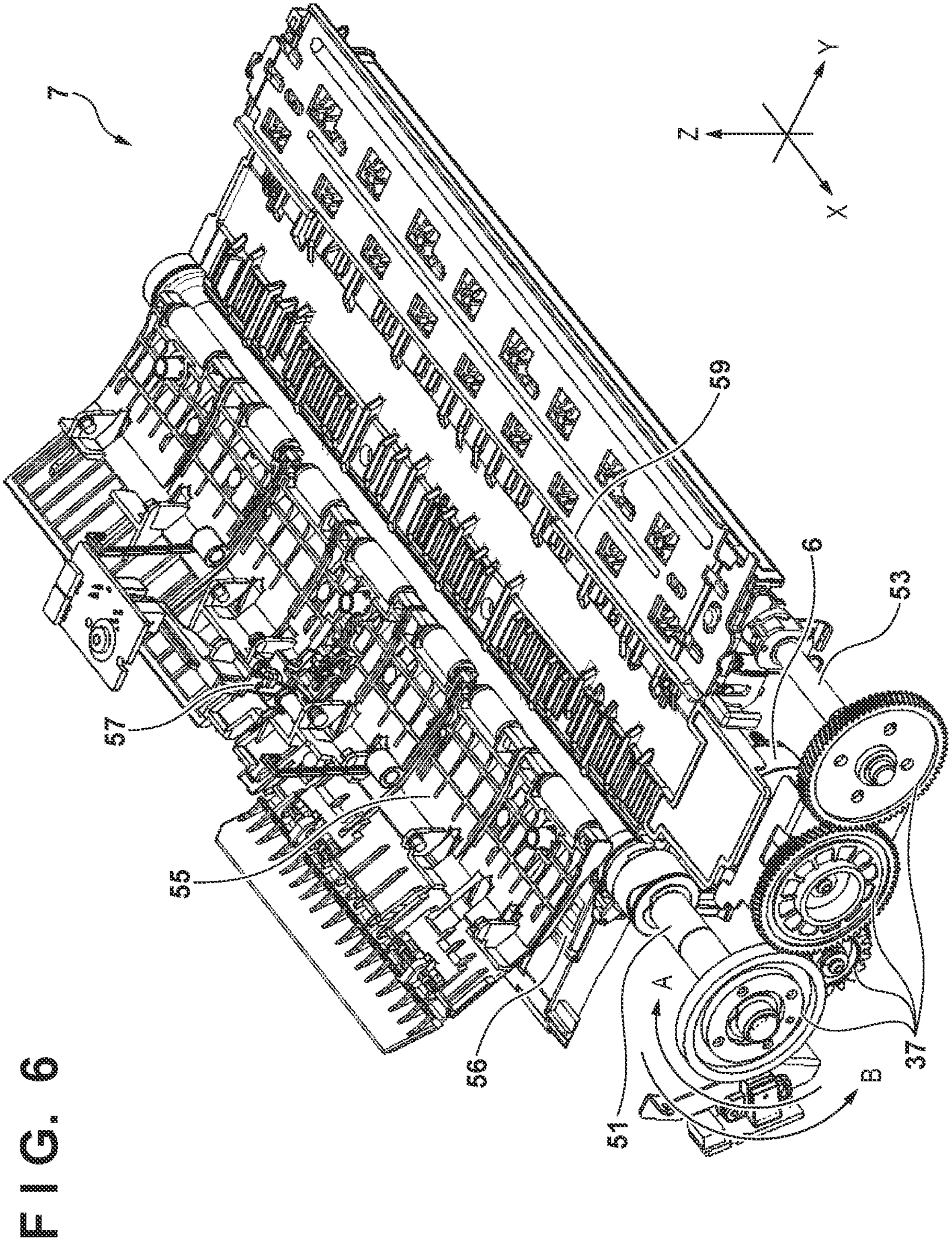
FIG. 6 is a perspective view of the conveyance unit.
Figure 7:
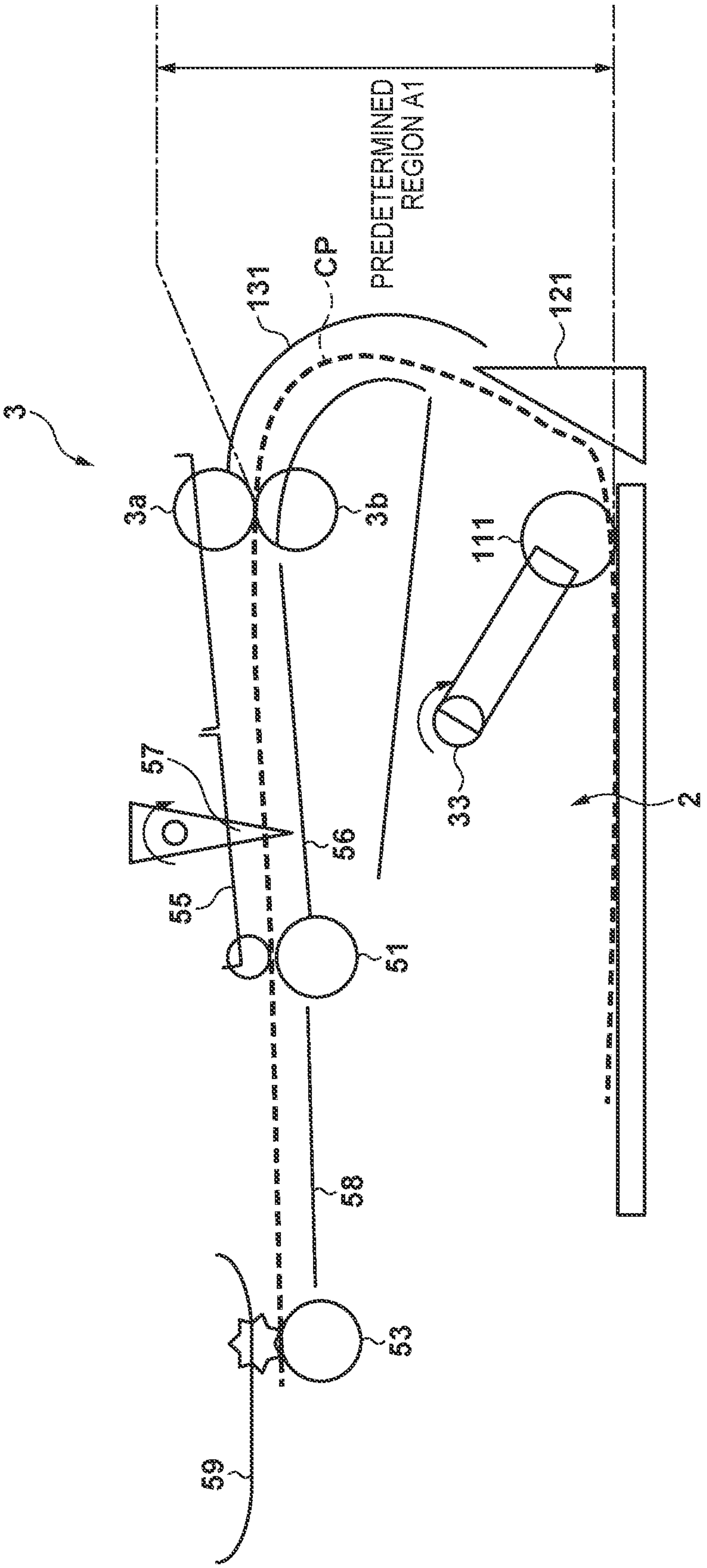
FIG. 7 is a schematic view of the conveyance unit and a conveyance path.

FIGS. 6 and 7 will be referred to in addition to FIGS. 1 and 2. FIG. 6 is a perspective view of the conveyance unit 5. FIG. 7 is a schematic view of the conveyance unit 5 and the conveyance path CP.

The conveyance unit 5 includes the conveyance roller 51, a pinch roller 52, the discharge roller 53, a spur 54, and the intermediate roller pair 3.

The conveyance roller 51 conveys a print medium along the conveyance path CP. In addition, the conveyance roller 51 conveys the print medium to the print position of the printing unit 7. The pinch roller 52 is provided to face the conveyance roller 51. The discharge roller 53 and the spur 54, which face each other, deliver the print medium to the discharge tray 81. The intermediate roller pair 3 is constituted by intermediate rollers 3*a* and 3*b* facing each other.

The intermediate roller 3*a* is provided between the conveyance roller 51 and the pickup roller 111 in the conveyance path CP.

As described above, in this embodiment, the drive motor 6 drives the respective types of rollers constituting the feeding unit 2 and the conveyance unit 5. That is, a print medium is conveyed in the printing apparatus 1 by using one drive source. Furthermore, the pickup roller 111, the intermediate roller 3*a*, the conveyance roller 51, and the discharge roller 53 are all rotated by a drive train coupled with the drive motor 6 as a drive source. This arrangement will be described more specifically below.

The conveyance roller 51 and the discharge roller 53 are coupled to the drive motor 6 with the gear train 37. When the drive motor 6 drives the conveyance roller 51 in the arrow A direction in FIG. 6, the conveyance roller 51 and the discharge roller 53 each rotate in a direction to convey a print medium to the downstream side in the conveying direction. When the drive motor 6 drives the conveyance roller 51 in the arrow B direction in FIG. 6, the conveyance roller 51 and the discharge roller 53 each rotate in a direction to convey the print medium to the upstream side in the conveying direction.

The conveyance roller 51 is coupled to an input gear 33 of the feeding unit 2 through a gear train (not shown). When the conveyance roller 51 rotates in the arrow A direction, the input gear 33 of the feeding unit 2 described above rotates in the A direction in FIG. 6, that is, a direction to perform a feeding operation. When the conveyance roller 51 rotates in the arrow B direction, the input gear 33 of the feeding unit 2 rotates in the B direction in FIG. 6, that is, a direction to perform a feed preparation operation. An encoder 813 (see FIG. 8) detects the drive amount of the drive motor 6. The speed and the drive amount of the drive motor 6 are controlled by performing various types of control such as PID control.

The conveyance path CP for a print medium in the printing apparatus 1 will be described next. The print medium conveyed by the pickup roller 111 of the feeding unit 2 passes through the conveyance path CP indicated by the dotted arrow in FIG. 7, is guided by the inclined surface member 121 and a U-turn member 131, and is conveyed to the intermediate roller pair 3. The print medium further conveyed by the intermediate roller pair 3 is guided by a pinch roller holder 55 and a guide portion 56 and fed to the conveyance roller 51.

The print medium fed to the conveyance roller 51 is subjected to skew correction and the like and then conveyed to the print position of the printing unit 7. The printing unit 7 performs printing on the print medium conveyed to the print position. The print medium conveyed from the conveyance roller 51 is guided by a platen 58 and a spur base 59 and then reaches the discharge roller 53. During a printing operation, a conveying operation is performed by either or both of the conveyance roller 51 and the discharge roller 53. Upon completion of the printing operation, the print medium is discharged to the discharge tray 81 by the discharge roller 53. In addition, the platen 58 guides the print medium so as to keep the distance between the print medium conveyed to the printing unit 7 and the nozzle constant.

In this embodiment, the inclined surface member 121 and the U-turn member 131 form a curved section CPI of the conveyance path CP. That is, the inclined surface member 121 and the U-turn member 131 are examples of path forming members that form the curved section CPI of the conveyance path CP.

The pinch roller holder 55 is provided with an end portion detection lever 57. When a print medium passes through the conveyance path CP, the end portion detection lever 57 is made to pivot to detect the leading end and trailing end positions of the print medium. That is, the print medium is detected at the detection position on the conveyance path. If, for example, the end portion detection lever 57 detects the leading end position of a print medium at the time of a feeding operation and detects the trailing end position at the time of a printing operation or discharging operation, it is possible to measure the actual length of the print medium based on the drive amount of the drive motor 6 which is required until the detection of the leading end position and the trailing end position. Although this case exemplifies the mechanical detection of end portions of the print medium with the end portion detection lever 57, the end portions of the print medium may be optically detected with a photosensor or the like.

Note that when a consecutive feeding operation (to be described later) is to be performed, after the trailing end of a preceding print medium passes through the pickup roller 111, a succeeding print medium is fed by the pickup roller 111 at a predetermined interval with a delay to the gear train, thereby consecutively performing a feeding operation.

<Control Arrangement>

Figure 8:
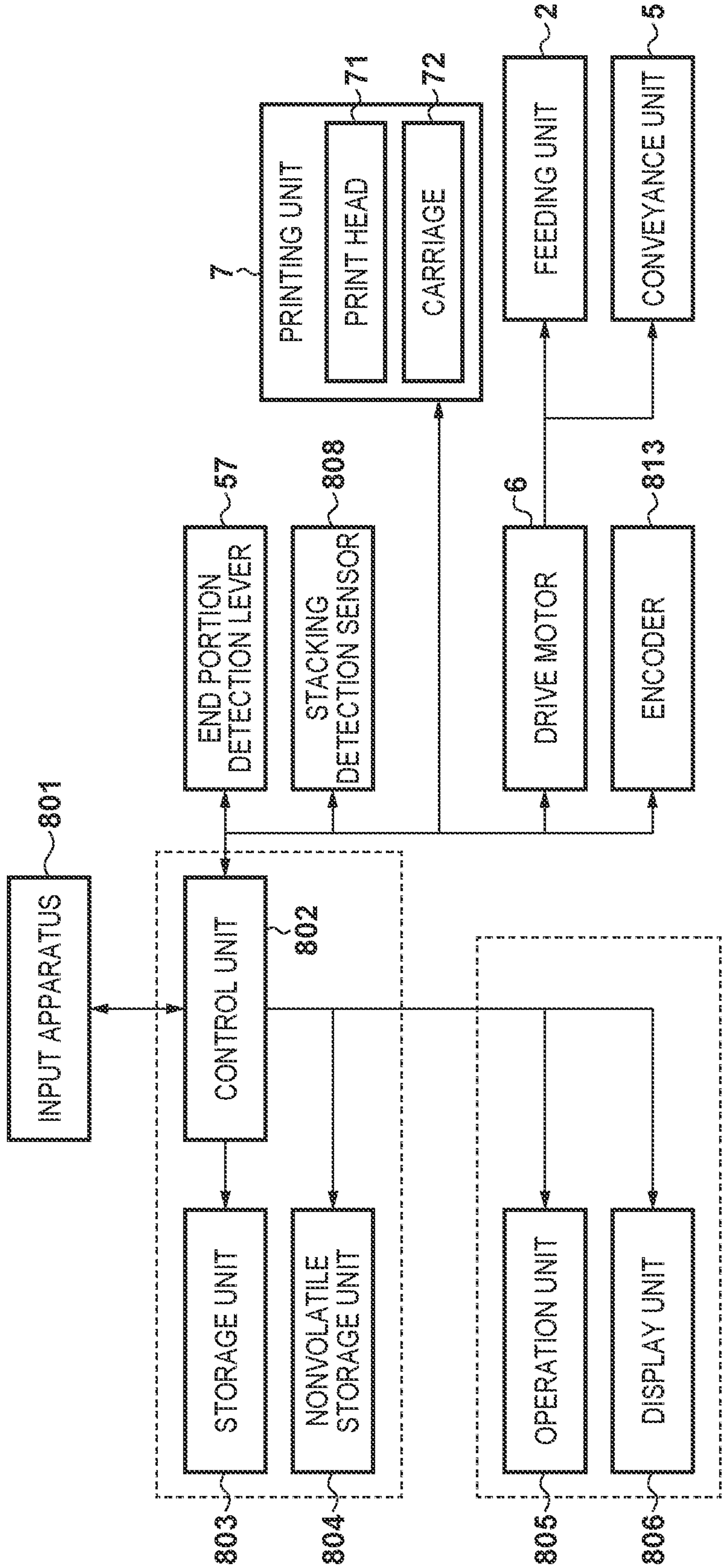
FIG. 8 is a block diagram showing the control arrangement of the printing apparatus.

FIG. 8 is a block diagram showing the control arrangement of the printing apparatus 1.

A control unit 802 comprehensively controls the printing apparatus 1. The control unit 802 is, for example, a Central Processing Unit (CPU). A storage unit 803 includes a Read Only Memory (ROM) and a Random Access Memory (RAM). The ROM stores various programs. The RAM provides a system work memory for allowing the CPU to operate as the control unit 802 and is used to temporarily store various data. For example, the CPU as the control unit 802 loads programs stored in the ROM included in the control unit 802 into the RAM included in the storage unit 803 and executes the programs, thereby implementing various functions of the printing apparatus 1. A nonvolatile storage unit 804 is, for example, a Hard Disk Drive (HDD) and stores various programs and data.

An operation unit 805 receives an operation input by the user. The operation unit 805 can include, for example, a touch panel and hard keys. For example, the control unit 802 controls the operation of the printing apparatus 1 in accordance with the contents of the operation of the operation unit 805 by the user, that is, instruction contents. Note that the control unit 802 can also receive instructions concerning the operation of the printing apparatus 1 from an input device 801 such as a PC or smartphone. A display unit 806 displays various types of information.

The control unit 802 obtains detection results from the end portion detection lever 57, a stacking detection sensor 808, and the encoder 813 and controls the drive motor 6 and the printing unit 7 based on the detection results and the like. In addition, as the control unit 802 controls the operation of the drive motor 6, various types of rollers and the like included in the feeding unit 2 and the conveyance unit 5 are driven. In this case, the stacking detection sensor 808 detects the stacked state of print media on the stacking portion 101. The encoder 813 detects the drive amount of the drive motor 6.

Control of the drive motor 6 will be further described below. In this embodiment, the drive motor 6 is a DC motor, and the control unit 802 controls the DC motor using a PWM value. For example, the control unit 802 controls the power (PWM value) to be supplied to the drive motor 6 in accordance with load variation so as to rotate the drive motor 6 at a target rotational speed. At this time, the control unit 802 adjusts the PWM value based on the difference between the actual rotational speed of the drive motor 6 based on the detection result obtained by the encoder 813 and the target rotational speed of the drive motor 6. The control unit 802 switches the drive control of the drive motor 6 in accordance with the position of a print medium S2 when starting a conveying operation in a consecutive feeding operation (to be described later).

Operation Example

<Outline of Printing Operation>

Figure 9:
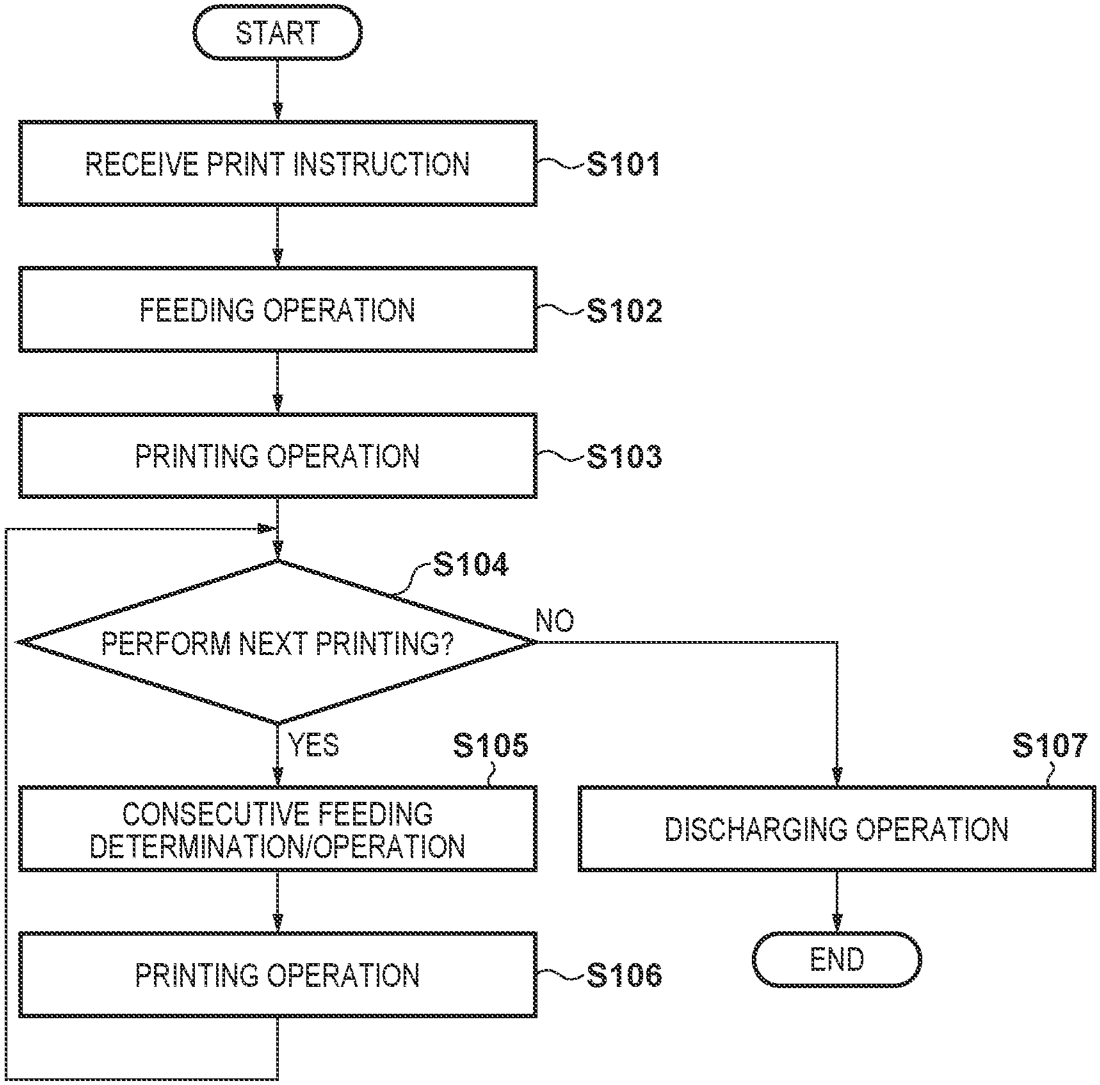
FIG. 9 is a flowchart showing an outline of a printing operation in the printing apparatus.

FIG. 9 is a flowchart showing an outline of the printing operation of the printing apparatus 1.

In step S101, the control unit 802 receives a print instruction. The control unit 802 receives a print instruction from the user via the operation unit 805 or the input device 801.

In step S102, the control unit 802 performs a feeding operation. The control unit 802 causes the drive motor 6 to drive the feeding unit 2 to feed the uppermost print medium of the print media stacked on the stacking portion 101 to the conveyance unit 5. In step S103, the control unit 802 causes the printing unit 7 to perform printing on the print medium conveyed to the conveyance unit 5. In this case, the printing unit 7 performs one-pass printing while moving the print head 71 in the widthwise direction of a print medium.

In step S104, the control unit 802 determines whether to perform the next printing by using the printing unit 7. The next printing in this case is one-pass printing to be performed after the print medium on which one-pass printing is performed in step S103 is fed by a predetermined amount. If the control unit 802 performs printing on the next print medium, the process advances to step S105. Otherwise, the process advances to step S107. If, for example, the control unit 802 performs printing on the entire print region of the print medium, the process advances to step S107.

In step S105, the control unit 802 executes consecutive feeding determination/operation. This operation will be described in detail later. In step S106, the control unit 802 executes printing on the print medium. In this case, as in step S103, the control unit 802 performs one-pass printing while moving the print head 71 in the widthwise direction of the print medium.

After the printing operation in step S106, the control unit 802 returns to step S104. That is, the control unit 802 performs printing on the entire print region of the print medium by repeating steps S104 to S106.

In step S107, the control unit 802 performs a discharging operation. The control unit 802 causes the drive motor 6 to drive the discharge roller 53 to discharge the print medium having undergone printing to the discharge tray 81. Thereafter, the control unit 802 ends the printing operation. Although FIG. 9 shows the printing operation on one print medium, the control unit 802 repeats this flowchart until the completion of printing on all the pages included in the print job.

Note that if the control unit 802 detects an abnormality during the execution of the above procedure by using the end portion detection lever 57, a stacking detection sensor 808, the encoder 813, or the like, the control unit 802 displays an error indication and an instruction to the user on the display unit 806. Error types include, for example, a paper jam error, a no paper error, and no ink error.

<Consecutive Feeding Operation>

A consecutive feeding operation will be subsequently described. A consecutive feeding operation in this embodiment indicates an operation of concurrently performing a conveying operation for a print medium (to be sometimes referred to as a print medium S1 hereinafter) during printing and a conveying (feeding) operation for the next print medium (to be sometimes referred to as a print medium S2 hereinafter). This consecutive feeding operation makes it possible to quickly transition to the printing operation for the print medium S2 upon completion of the printing operation for the print medium S1, thereby shortening the time required for printing on a plurality of print media.

On the other hand, in a consecutive feeding operation, the torque required for feeding sometimes varies depending on the position of the print medium S2 on the conveyance path CP. For example, viewing in the direction in FIG. 7, when the leading end of the print medium S2 in the conveying direction is located in a curved section in the conveying direction, the torque required for the leading end can be relatively larger than when the leading end is located in a straight section. If the required torque is large, the drive motor 6 may lack torque, the accuracy of conveying control may deteriorate, or the drive of the drive motor 6 may stop. Accordingly, in this embodiment, the following flowchart is used to perform a consecutive feeding operation while suppressing the occurrence of a shortage of torque.

Figure 10:
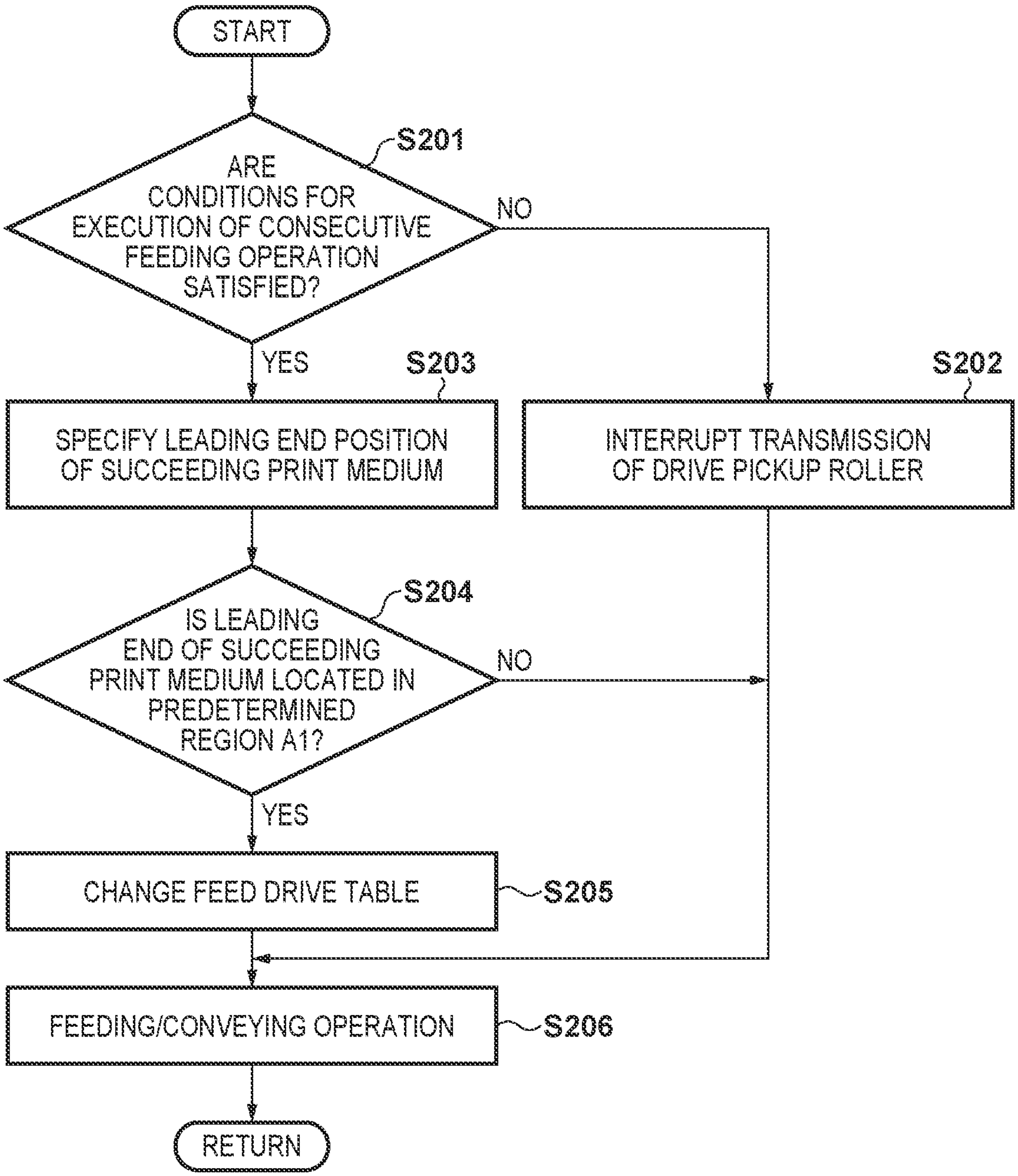
FIG. 10 is a flowchart showing a consecutive feeding operation in the printing apparatus.

FIG. 10 is a flowchart showing a consecutive feeding operation in the printing apparatus 1 and a specific example of processing in step S105 in FIG. 9.

In step S201, the control unit 802 determines whether the conditions for the execution of a consecutive feeding operation are satisfied. If YES in step S201, the process advances to step S203; otherwise, the process advances to step S202. For example, depending on the size, thickness, material, and basis weight of a print medium, the conveying speed at the time of printing, and the like, a large torque is required for the conveyance of a single print medium, and it is not sometimes appropriate to perform a consecutive feeding operation. Accordingly, the control unit 802 determines whether to perform a consecutive feeding operation based on information such as the size and type of print medium and a conveying speed setting at the time of printing obtained from a print job or the set information and the like of the printing apparatus 1 stored in the storage unit 803 or the like.

In step S202, the control unit 802 interrupts the transmission of drive from the drive motor 6 to the pickup roller 111. Subsequently, the control unit 802 advances to step S206.

In step S203, the control unit 802 specifies the leading end position of the succeeding print medium S2. In this embodiment, the control unit 802 specifies the leading end position of the succeeding print medium S2 by using the detection result obtained by the end portion detection lever 57. More specifically, the control unit 802 specifies the leading end position of the print medium S2 based on the leading end position of the print medium S1 specified by the end portion detection lever 57, the length of the print medium S1 in the conveying direction, and the interval between the trailing end of the print medium S1 and the leading end of the print medium S2 in the conveying direction.

More specifically, first of all, the control unit 802 obtains a conveyance amount d1 of the print medium S1 since the detection of the leading end of the print medium S1 by the end portion detection lever 57 from the detection result obtained by the encoder 813. The control unit 802 calculates a distance L1 from the detection position of the end portion detection lever 57 to the trailing end of the print medium S1 from the conveyance amount d1 and a length lp of the print medium. The length lp can be obtained from, for example, a set value or the like included in a print job.

The relationship among the conveyance amount d1, the length lp, and the distance L1 is expressed by L1=lp−d1. A distance L2 from the end portion detection lever 57 to the leading end of the print medium S2 can be expressed by L2=lp−d1+pp by using this relationship and a delay amount pp of the gear train described above. This arrangement makes it possible to specify a leading end position P of the print medium S2 without providing any sensor or the like in a predetermined region A1.

In step S204, the control unit 802 determines whether the stop position P of the leading end of the print medium S2 is located in the predetermined region A1. If YES in step S204, the process advances to step S205; otherwise, the process advances to step S206.

In this embodiment, the predetermined region A1 is a region based on the conveyance load of a print medium. Furthermore, the predetermined region A1 is a region where the conveyance load becomes relatively high in a feeding operation for a print medium. More specifically, the predetermined region A1 in this embodiment is a region between the pickup roller 111 and the intermediate roller pair 3. When the inclined surface member 121 and the U-turn member 131 are located in the conveyance path CP between the pickup roller 111 and the intermediate roller pair 3 as in the embodiment, the conveyance load of a print medium becomes high in a curved section formed by these components. In this regard, in the embodiment, the curved section formed by path forming members such as the inclined surface member 121 and the U-turn member 131 can be said to be set as the predetermined region A1.

Note that the region where the conveyance load becomes high is not limited to this depending on the arrangements and numbers of various rollers and conveyance guide members. In addition, there may be a plurality of regions where the conveyance loads are high.

Whether the stop position P of the print medium S2 is located in the predetermined region A1 can be determined as follows. Assume that the distance from the end portion detection lever 57 to the intermediate roller pair 3 is a distance Ps1, and the distance from the end portion detection lever 57 to the pickup roller 111 is a distance Ps2. In this case, if the distance L2 from the end portion detection lever 57 to the leading end of the print medium S2 satisfies Ps1<L2<Ps2, it can be determined that the stop position is located in the predetermined region A1.

In step S205, the control unit 802 changes the feed drive table. For example, the control unit 802 changes the feed drive table to a table with a low acceleration.

FIG. 11 shows an example of feed drive tables. In this case, table 1 is a table to be used when a consecutive feeding operation is not performed or when the leading end position of the print medium S2 is located outside the predetermined region A1 in a case in which a consecutive feeding operation is to be performed. Table 2 is a table to be used when a consecutive feeding operation is to be performed and the leading end position of the print medium S2 is located in the predetermined region A1. The control unit 802 changes the feed drive table from table 1 to table 2. Table 2 is the same as table 1 in the rotational speed of the drive motor 6 at the time of constant-speed rotation, but the acceleration is set to be lower than in table 1.

That is, when the leading end of the print medium S2 is located in the predetermined region A1, the control unit 802 switches the drive control of the drive motor 6 so as to reduce the acceleration of the drive motor 6 to an acceleration lower than that of when the leading end is not located in the predetermined region A1. Note that in this case, the control unit 802 changes the acceleration of the drive motor 6. When, however, the leading end of the print medium S2 is located in the predetermined region A1, control may be performed to limit the drive (output) of the drive motor 6 as compared when the leading end is not located in the predetermined region A1. For example, when the leading end of the print medium S2 is located in the predetermined region A1, the control unit 802 may switch the drive control of the drive motor 6 to reduce the rotational speed of the drive motor 6 to a speed lower than that of when the leading end is not located in the predetermined region A1. Note that the rotational speed in this case is a rotational speed at the time of constant-speed rotation after acceleration. Alternatively, when the leading end of the print medium S2 is located in the predetermined region A1, the control unit 802 may switch the drive control of the drive motor 6 so as to reduce both the acceleration and the rotational speed of the drive motor 6 to an acceleration and a speed lower than those of when the leading end is not located in the predetermined region A1.

In step S206, the control unit 802 performs a feeding/conveying operation. In this case, if conditions for the execution of a consecutive feeding operation are not satisfied (S201: No), since the transmission of drive to the pickup roller 111 is interrupted (S202), only a conveying operation for the preceding print medium S1 is performed. Alternatively, if the conditions for the execution of a consecutive feeding operation are satisfied (S201: Yes) and the leading end of the print medium S2 is located in the predetermined region A1 (S204: Yes), a consecutive feeding operation is performed after the feed drive table is changed. That is, a consecutive feeding operation is performed while the drive of the drive motor 6 is limited. Alternatively, if the conditions for the execution of a consecutive feeding operation are satisfied (S201: Yes) and the leading end of the print medium S2 is not located in the predetermined region A1 (S204: No), a consecutive feeding operation is performed without any change in the feed drive table. That is, a consecutive feeding operation is performed while the drive of the drive motor 6 is not limited. Subsequently, the control unit 802 ends the flowchart.

As described above, in this embodiment, the drive control of the drive motor 6 is switched in accordance with the position of the succeeding print medium S1. Accordingly, it is possible to execute a consecutive feeding operation while suppressing the occurrence of a shortage of torque in the drive motor 6. That is, it is possible to more effectively perform the drive control of the drive source that drives a plurality of conveyance units.

OTHER EMBODIMENTS

In the above embodiments, when the leading end of the print medium S2 is located in the predetermined region A1, the control unit 802 switches the drive control of the drive motor 6 so as to reduce the acceleration of the drive motor 6 to an acceleration lower than that of when the leading end is not located in the predetermined region A1. This suppresses the drive load of the drive motor 6 from excessively increasing. On the other hand, suppressing the drive of the drive motor 6 more than necessary may cause a deterioration in the efficiency of a printing operation. Accordingly, the control unit 802 may reduce such limitation in accordance with the PWM value during the limitation of the drive of the drive motor 6.

For example, when printing on a plurality of print media, the control unit 802 checks the PWM value at the time of drive control of the drive motor 6 in accordance with table 2 in FIG. 11 a plurality of times (for example, one to three times). If the maximum value of the checked PWM value is equal to or less than a threshold, the control unit 802 may change the acceleration of the drive motor 6 (a2<a3<a1) when the print medium S2 is located in the predetermined region A1. This makes it possible to appropriately switch the drive control of the drive motor 6 in accordance with a remaining force with respect to the load of the drive motor 6. In addition, a plurality of tables with different accelerations may be prepared, and one of the tables may be selected in accordance with a checked PWM value.

Note that when the drive of the drive motor 6 is limited in accordance with the rotational speed, the control unit 802 may reduce the limitation by increasing the rotational speed.

The above embodiment uses the length lp of the print medium S1 which is obtained from a set value or the like included in a print job. Another embodiment may use the length lp obtained from a set value or the like included in a print job for a first plurality of print media and use, as the length lp, the measurement result on the first plurality of print media of succeeding print media. The length lp of a print medium can be measured by obtaining the rotation amount of the drive motor 6 during the detection of the print medium by the end portion detection lever 57 by using the encoder 813 and converting the rotation amount of the drive motor 6 into the conveyance amount of the conveyance roller 51.

In the above embodiments, the leading end position of the print medium S2 is specified based on the position of the print medium S1. However, the method of specifying the leading end position of the print medium S2 can be changed as appropriate. For example, the predetermined region A1 may be provided with a sensor that detects a print medium, and the presence of the leading end position of the print medium S2 in the predetermined region A1 may be specified based on the detection result obtained by the sensor. For example, the upstream and downstream ends of the predetermined region A1 may be respectively provided with sensors that detect a print medium. The control unit 802 may determine that the leading end of the print medium S2 is located in the predetermined region A1 in the interval between when the sensor on the upstream end detects the print medium S2 and when the sensor on the downstream end detects the print medium S2. Alternatively, the leading end position of the print medium S2 may be specified based on the detection result obtained by an encoder or the like that detects the rotational angle of the pickup roller 111.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-161833, filed Oct. 6, 2022, which is hereby incorporated by reference herein in its entirety.

What is claimed is:

1. A printing apparatus comprising:

a printing unit configured to perform printing on a print medium;

a first conveyance unit provided in a conveyance path and configured to convey a print medium to a print position of the printing unit;

a second conveyance unit provided upstream of the first conveyance unit in the conveyance path and configured to convey a print medium;

a third conveyance unit provided between the first conveyance unit and second conveyance unit in the conveyance path;

a drive source configured to drive the first conveyance unit and the second conveyance unit; and a control unit configured to control the drive source so as to execute a conveying operation in which a second print medium succeeding a first print medium is conveyed by the second conveyance unit while the first print medium is conveyed by the first conveyance unit, wherein the control unit is configured to switch drive control of the drive source when a leading end of the second print medium in a conveying direction is located in a predetermined region based on a conveyance load of the print medium, and wherein the predetermined region is a section between the second conveyance unit and the third conveyance unit.

2. The apparatus according to claim 1, further comprising a path forming member configured to form a curved section of the conveyance path, wherein the predetermined region includes the curved section formed by the path forming member.

3. The apparatus according to claim 1, wherein the section is provided with an inclined surface member.

4. The apparatus according to claim 1, further comprising a stacking portion on which print media are stacked, wherein the second conveyance unit is configured to convey a print medium stacked on the stacking portion to the conveyance path.

5. The apparatus according to claim 1, wherein when the leading end of the second print medium is located in the predetermined region, the control unit switches the drive control so as to reduce an acceleration of the drive source to an acceleration lower than an acceleration when the leading end of the second print medium is not located in the predetermined region.

6. The apparatus according to claim 1, wherein when the leading end of the second print medium is located in the predetermined region, the control unit switches the drive control so as to reduce a rotational speed of the drive source to a rotational speed lower than a rotational speed when the leading end of the second print medium is not located in the predetermined region.

7. The apparatus according to claim 1, wherein the drive source is a DC motor, and the control unit controls the DC motor using a PWM value.

8. The apparatus according to claim 7, wherein when the leading end of the second print medium in a conveying direction is located in the predetermined region, the control unit is configured to limit drive of the drive source more than that when the leading end of the second print medium is not located in the predetermined region, and the control unit is configured to reduce the limitation in accordance with the PWM value during the limitation of the drive of the drive source.

9. The apparatus according to claim 1, further comprising a detection unit configured to detect a print medium at a detection position on the conveyance path, wherein the control unit is configured to switch drive control of the drive source in accordance with a position of the second print medium specified by using a detection result obtained by the detection unit.

10. The apparatus according to claim 9, wherein the control unit is configured to specify a leading end position of the second print medium based on a leading end position of the first print medium specified by the detection unit, a length of the first print medium in a conveying direction, and an interval between a trailing end of the first print medium and the leading end of the second print medium in the conveying direction.

11. The apparatus according to claim 1, further comprising:

a print head of the printing unit configured to perform printing on a print medium; and a carriage configured to move the print head in a widthwise direction of the print medium which intersects the conveying direction.

12. A control method for a printing apparatus including a printing unit configured to perform printing on a print medium, a first conveyance unit provided in a conveyance path and configured to convey a print medium to a print position of the printing unit, a second conveyance unit provided upstream of the first conveyance unit in the conveyance path and configured to convey a print medium, a third conveyance unit provided between the first conveyance unit and a second conveyance unit in the conveyance path, and a drive source configured to drive the first conveyance unit and the second conveyance unit, the method comprising:

executing, by controlling the drive source, a conveying operation in which a second print medium succeeding a first print medium is conveyed by the second conveyance unit while the first print medium is conveyed by the first conveyance unit; and switching drive control of the drive source when a leading end of the second print medium in a conveying direction is located in a predetermined region based on a conveyance load of the print medium, wherein the predetermined region is a section between the second conveyance unit and the third conveyance unit.

* * * * *